United States Patent [19]

Buchanan

[11] Patent Number: 5,012,678
[45] Date of Patent: May 7, 1991

[54] OVERPRESSURE RELIEF SAFETY PLUG FOR PRESSURE GAUGES

[75] Inventor: Steven O. Buchanan, Rolling Prairie, Ind.

[73] Assignee: Dwyer Struments, Inc., Michigan City, Ind.

[21] Appl. No.: 567,404

[22] Filed: Aug. 15, 1990

[51] Int. Cl.$^5$ .................... G01L 19/06; G01L 19/14
[52] U.S. Cl. .......................... 73/738; 73/431; 73/756
[58] Field of Search ............... 73/738, 756, 431, 715, 73/716-728

[56] References Cited

U.S. PATENT DOCUMENTS

| | | | |
|---|---|---|---|
| 3,201,992 | 8/1965 | Hoff, Jr. | 73/738 |
| 3,645,140 | 2/1972 | Phillips et al. | 73/716 |
| 4,011,759 | 3/1977 | Phillips et al. | 73/716 |
| 4,030,365 | 6/1977 | Phillips et al. | 73/708 |
| 4,347,744 | 9/1982 | Buchanan | 73/738 |

Primary Examiner—Donald O. Woodiel
Attorney, Agent, or Firm—Lee, Mann, Smith, McWilliams & Sweeney

[57] ABSTRACT

An overpressure relief plug for safeguarding pressure gauges that tend to damage due to internal overpressure comprising a safety plug for interference sealing fit application to an aperture formed in the pressure gauge housing that otherwise communicates the housing chamber that may be subject to overpressure to the ambient atmosphere, which plug is formed from silicon elastomer to define a shank that is pressed into the housing aperture, a grip portion on one end of the plug shank that is to aid in initially applying the plug to the housing as part of the gauge assembly procedure, and a stop cap at the other end of the shank that forms a head for the plug and that is spherically contoured and defines a planar stop annular surface thereabout having a marginal rim proportioned for firm sealing engagement with the exterior surface of the housing on application of the plug to the housing, with the plug shank and aperture being proportioned to "pop out" of the housing aperture when the pressure of the housing chamber subject to relief protection is above a predetermined minimum gauge pressure and no more than about a maximum gauge pressure.

12 Claims, 2 Drawing Sheets

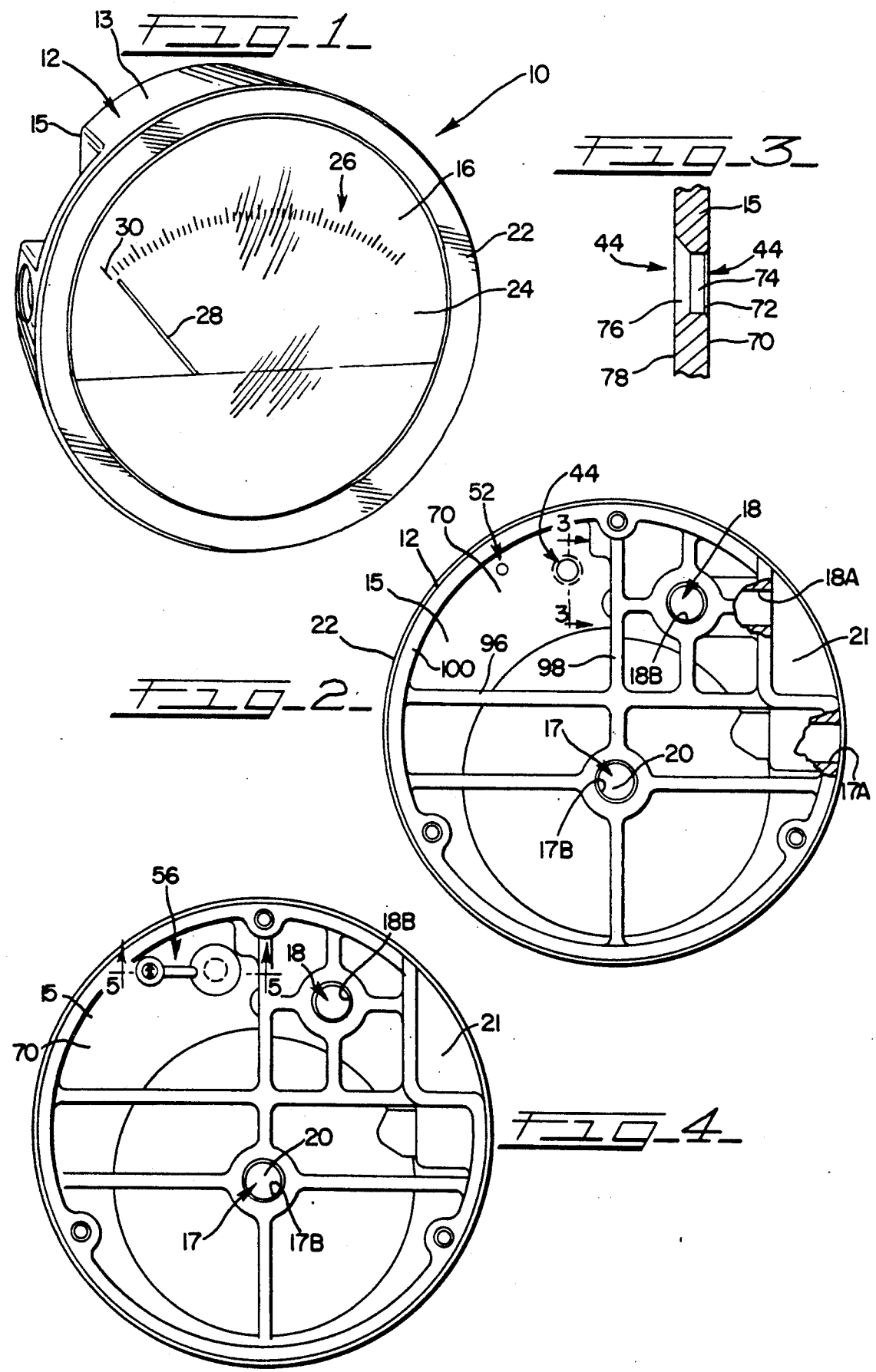

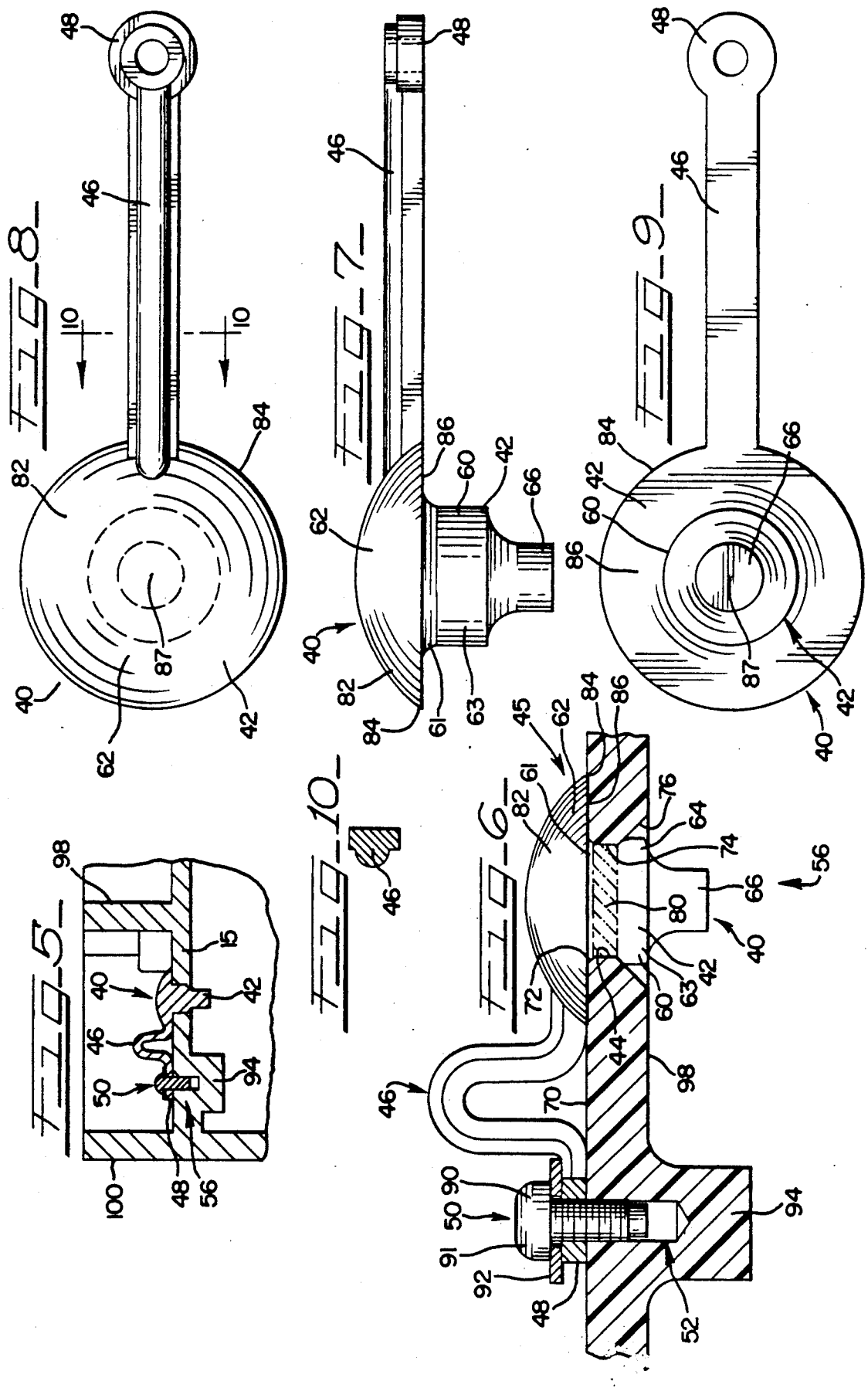

OVERPRESSURE RELIEF SAFETY PLUG FOR PRESSURE GAUGES

This invention relates to safety plugs for pressure gauges, and more particularly to safety plugs for pressure gauges that both protect the gauge from damage to internal overpressure and yet permit reuse of the plug after overpressure is relieved.

Pressure gauges of the type to which the invention is particularly applicable commonly comprise a housing formed from a suitable metallic material, such as aluminum or an aluminum alloy, that encloses a sensing mechanism for sensing pressure of air or other gas at a source externally of the housing by way of a suitable tubular connection therebetween, with the face of the housing including suitable analog indication of the gauge pressure measured, that also usually includes the housing being open to receive a dial plate having a pressure scale over which a pointer arm actuated by the measuring mechanism involved is to move for visual reading of the pressure measured, with the housing normally including a transparent cover suitably fixed to the housing in sealing relation thereto over the scale plate. Experience has shown that pressures encountered can be higher or over the pressure the gauge is designed to handle, and when the gauge is not arranged to avoid unintended blow out when such overpressures are encountered, the unintended blow out is likely to occur through the front of the gauge, with consequent danger of injury to the operator or technician monitoring the gauge. This is true for both gauges of the absolute type as well as differential pressure gauges of the general type shown in Phillips and Zoludow U.S. Pat. No. 3,645,140, and Phillips and Troyer U.S. Pat. Nos. 4,011,759 and 4,030,365, the disclosures of which are hereby incorporated herein by this reference.

Pressure gauges of the differential pressure type that are a commercial product of the Assignee of the Applicant, Dwyer Instruments, Inc., of Michigan City, Indiana, include a flexible diaphragm that is to be exposed to differential pressures to operate a sensitive and accurate transmitting indicator mounted in the gauge housing. In the arrangements of the U.S. patents referred to, the motion transmitting device is in the form of a pivotally mounted helix cooperating with a range spring mounted magnet to indicate differential pressures and changes in same, by way of linear movement of the magnet through a linkage connection of the range spring to the diaphragm. The linear motion of the magnet is translated by the helix into rotary movement of a pointer arm carried by the helix that cooperates with the gauge dial that is equipped with scale indicia including a zero datum to which the pointer arm is to be set by the gauge set device.

The applicant's prior U.S. Pat. No. 4,347,744, which is also assigned to the indicated Assignee, discloses a gauge housing in the form of a housing member having a back or bottom plate member and a screw-in cover formed from a transparent material that is arranged to resist blow out through the front of the gauge. The gauge housing member and back plate are secured together to clamp the diaphragm in its operating position, and in accordance with the invention of that patent, the diaphragm marginal rim portion and the corresponding surfaces of the housing member and back plate engaging same are formed to provide for overpressure relief by way of fluid blow out through the back of the gauge when overpressures are experienced.

It will be apparent that the blow out providing membrane of the special diaphragm of the applicant's said prior U.S. Pat. No. 4,347,744, after overpressure has been relieved, has to be replaced, which involves taking the gauge apart, in order that the gauge can be reused and still provide the same overpressure protection.

A principal object of the present invention is to provide gauges of the type indicated with overpressure protection that both avoids catastrophoric accidents of the type indicated due to the instrument being subjected internally with overpressure, and permits the instrument to be immediately restored for overpressure protection and for use as a pressure measuring instrument, without taking the instrument apart to do so.

Another principal object of the invention is to provide overpressure protection for gauges of the type indicated in the form of a special housing plug that "blows out" when overpressure occurs internally of the instrument, and which is anchored to the instrument for ready return of overpressure protection for the gauge and for continued use of the instrument for pressure measurement.

Still another object of the invention is to provide effective overpressure relief protection for pressure gauges in the form of a "blow out" plug that is press fitted, for sealing purpose, into a gauge housing aperture that communicates the internal chamber of the gauge housing that may be subject to overpressure to ambient atmosphere, with the plug and aperture being proportioned for plug "blow out" when the gauge pressure in the housing internal chamber involved reaches a minimum level that is below a specific maximum level.

Yet a further object of the invention is to provide pressure gauge overpressure relief protection that is low cost in nature, that is easily made effective when needed, either when the instrument is new or when the instrument has successfully experienced overpressure relief conditions, and that requires no major modification of the instrument to achieve effective overpressure protection for same.

In accordance with the invention, pressure gauge overpressure protection is provided that reliably activates pressure relief when the internal pressure range of the housing pressure chamber involved reaches a predetermined minimum that is no more than a predetermined maximum comprising a blow out plug that is press fitted for sealing purposes into an aperture of the housing that communicates the housing internal chamber in which overpressure is likely to occur to the ambient atmosphere.

The plug is formed from Shore A hardness scale 30 durometer silicon elastomer to define a seal body that defines a shank that is to be press fitted for sealing purposes into the housing aperture, with the shank having a stop cap or head at one end of same that is spherically contoured and defines a planar under surface of special significance that is to fit flush against the housing about the outlet of the housing aperture, a finger or tool gripping portion at the other end of the plug shank that facilitates application of the plug to the housing on initial assembly of the housing, and a mounting strap integral with the plug stop cap or head that includes at its free end an anchoring annulus for making the plug fast to the housing against free flight should "blow out" due to overpressure occur.

The housing aperture, further in accordance with the invention, is defined by the metallic material of the housing and preferably is round in transverse cross-sectional configuration, as is the plug shank.

The plug shank and the housing aperture are proportioned so that approximately 11½ per cent (preferably about 11.4 per cent) of the plug shank diameter, at its seal area that is to form the seal with the housing, is compressed by the interference fit of the plug shank within the indicated housing aperture.

The result is that the interference fit of the plug shank within the housing aperture generates full sealing of the housing at the shank seal area, up to the limits indicated, with the plug having been specifically processed prior to use to provide such consistent frictional holding forces at the shank seal area.

Other objects, uses, and advantages will be obvious or become apparent from a consideration of the following detailed description and the application drawings, in which like reference numerals indicate like parts throughout the several views.

In the drawings:

FIG. 1 is a diagrammatic perspective view illustrating a differential pressure gauge of the type to which the invention is applicable, with the gauge being shown from its front side but angled to include part of the gauge housing, including an illustration of one of the housing pressure input ports adjacent the back of the housing;

FIG. 2 is a rear elevational view of the gauge of FIG. 1, showing in plan the rear of the housing of the gauge shown in FIG. 1, illustrating specifically several rearwardly located high and low pressure ports for same, as well as the housing aperture at the rear of same for application thereto of the overpressure plug of the present invention;

FIG. 3 is a sectional view through the rear wall of the gauge housing at the location of the housing overpressure plug receiving aperture, indicating the shape of same, taken substantially along line 3—3 of FIG. 2;

FIG. 4 is similar to FIG. 2, except that one embodiment of the Applicant's overpressure plug arrangement is shown applied to the housing aperturing therefor that is indicated in FIG. 2;

FIG. 5 is a diagrammatic sectional view of the gauge housing and overpressure arrangement of the present invention, taken substantially along line 5—5 of FIG. 4;

FIG. 6 is an enlarged view of the overpressure plug and gauge housing wall shown in FIG. 5;

FIG. 7 is a side elevational view of the overpressure plug per se, with its mounting strap oriented 180 degrees opposite the showing of same of FIGS. 5 and 6;

FIG. 8 is a top plan view of the overpressure plug shown in FIG. 7;

FIG. 9 is a bottom plan view of the overpressure plug that is shown in FIG. 7; and FIG. 10 is a transverse sectional view through the plug mounting strap, taken along line 10—10 of FIG. 8.

However, it is to be understood that the specific drawing illustrations provided are supplied primarily to comply with the requirements of the Patent Laws, and that the invention is susceptible of modifications and variations that will be obvious to those skilled in the art, and which are intended to be covered by the appended claims.

Reference numeral 10 of FIG. 1 generally indicates in a diagrammatic manner a specific differential pressure gauge to which the invention of the present application is shown applied, with the instrument 10 comprising housing 12, defining side wall 13 and rear wall 15, with the side wall 13 defining the usual open end that is closed by transparent cover 16 to form the instrument pressure cavity that for differential pressure gauges is divided into a low pressure chamber 17 and a high pressure chamber 18 that are separated by a flexible diaphragm 20, as is more specifically disclosed in the U.S. patents that have been hereinbefore identified.

The cover 16 is preferably a disk like item formed from a transparent rigid high strength plastic material, such as an acrylic, or a polycarbonate, and is held in place on the instrument by annular cap or bezel 22 that may be formed from the same material as the housing 12; the bezel 22 is threadedly secured to the housing 12 across its open end. Applied to the instrument 10 below the cover 16 is a suitable scale dial 24 bearing scale 26 with which a pointer arm or indicator 28 cooperates to give in an analog manner the desired pressure reading with regard to a datum zero 30.

As disclosed in said cited U.S. patents, and is common knowledge in this art, the diaphragm 20 is part of a sensing mechanism within the housing 12 for measuring the pressure of a source of pressure located externally of the instrument 10. In the form shown, the instrument 10 being of the differential pressure type, has the instrument high pressure chamber 17 appropriately connected as at internally threaded port 18A to one source of pressure while the low pressure chamber 16 is operably connected by a similar internally threaded port 17A to another source of pressure, normally it having a pressure lower than the pressure source to which the high pressure chamber is connected, for operating instrument 10 to read the differential pressures between the two in an analog manner by the pointer arm 28 cooperating with the scale 26, as is well known in the art; ports 17A and 18A being oriented to have parallel central axes, and with the housing 12, define a right angled indentation 21 (see FIG. 2) in the specific instrument 10 illustrated. Such instrument 10 is also provided with alternate internally screw threaded ports 17B and 18B, leading to the low and high pressure chambers respectively, that form alternate sockets for alternate use by the installer instead of the internally threaded ports 17A and 18A at the sides of the instrument (see FIG. 2) for connection to the respective low and high pressure sources, as the needs and choices of the installer indicate; regardless of which set of ports 17A, 18A, or 17B, 18B are used, the other set of ports is closed by externally threaded metal plugs, as is well known in the art.

Insofar as the instant disclosure is concerned, as shown in FIG. 2, the aperture or bore 44 is formed in the housing rear wall 15 to, in a force fit, interference fit, manner, receive and mount the body 42 of overpressure plug 40, which includes also mounting strap 46 and its anchoring annulus 48 that in the form shown is made fast to the housing 12 by a threaded screw device 50 applied to aperture 52 formed in the housing rear wall 15 (see FIGS. 2, 5, and 6).

The overpressure plug 40 is part of an overpressure plug arrangement 56 (including plug 40 and housing aperature 44) that has several important aspects which will now be outlined:

Referring now more specifically to FIGS. 6–10, the body 42 of the overpressure plug 40 comprises stem or shank 60 having at one of its ends 61 a stop cap 62 with which the mounting strap 46 is integral; strap 46 is also integral with annulus 48. Shank or stem 60 defines side surface 63.

At the other end 64 of shank 60 the body 42 defines a tool or finger gripping portion 66.

As indicated in FIG. 3, housing aperture 44 at the housing rear wall external surfacing 70 defines, for the specific aperture 44 there illustrated, a relatively thin converging (45 degree angulation) entrance portion 72, an annular shaped restriction or mid portion 74 of quadrilateral transverse section configuration, and a diverging relatively deep diverging (82 degree angulation) portion 76 at the internal surfacing 78 of the housing wall 15. This aperture 44 configuration is formed directly in the metal forming housing 12.

The dimensioning of the plug shank 60 and the annular restricting portion 74 of the aperture 44 is proportioned as part of the Applicant's desire to achieve full blow out protection for the gauge 10, and in accordance with this, the overpressure arrangement 56 is concerned with the diameter of the aperture portion 74 being dimensioned to effect approximately 11½ per cent (preferably 11.4 per cent) compression of the plug shank diameter at the area of contact of the hole portion 74 with the plug shank 60, which forms the seal area or band 80 that is indented about the plug body 42, namely at its side surfacing 63, of its shank 60, as indicated in enlarged FIG. 6, whereby, when the gauge pressure limit hereinafter referred to (for the gauge internal chamber protected by a specific plug 40) is exceeded, the plug 40 "blows out" of aperture 44. In a specific embodiment of the arrangement 56, the plug body 42 at its shank 60 has a diameter that lies in the range of from 0.253 to 0.257 inches, while the diameter of the opening annulus portion 74 is in the range of from approximately 0.225 inch to approximately 0.227 inch; furthermore, it is preferred that the aperture portion 74 be approximately 0.05 inch long in defining the seal area 80.

It will thus be seen that when the plug 40 is applied to the aperture 44, the overpressure arrangement 56 provides an interference fit between the plug 40 and the aperture 44, with the proportioning involved producing or generating a normal force that is evenly distributed about the plug shank 60 at the indicated indented seal area 80 to produce the approximate 11½ per cent compression indicated, with the result that the plug 40 is held in place within the aperture 44 (up to the gauge pressure limits hereinafter referred to) by static friction that is made consistent about the area 80 by the processing of the plug 40 that will be disclosed hereinafter.

As indicated in FIGS. 6-9 of the drawings, the plug stop cap 62 defines a spherically contoured external or head surfacing 82 that terminates at a rounded marginal and annular rim 84 that marks the limits of annular and planar undersurface 86 of the plug 40 which is disposed normally of the central axis 87 of the plug shank 60, and in application of the plug 40 to the aperture 44, is disposed in flush sealing relation against the housing rear wall external surfacing 70. As indicated in FIGS. 6 and 7, the diameter of cap rim 84 is preferably approximately twice that of the plug shank 60.

Thus, the plug 40 may be force fitted into the aperture 44 by applying finger pressure to the stop cap surface 82 and pulling on the plug grip portion 66 with ones finger or a suitable gripping tool while the gauge housing 12 remains unassembled.

The plug 40 is preferably made from a Shore A hardness scale 30 durometer silicon rubber whereby it will be seen that the plug body 42 of plug 40 is defined by compressible material, this material being preferred as it is known not to weaken or creep under long term loads, it also has been found to have a special action of its surfacing pores that enables the plug 40 to be processed to insure that consistent frictional holding forces are obtained in the seal area 80 of the plug when it is in place, and it displays minimum set under compression, insuring a consistent plug holding force during use and reuse.

For this purpose, after the plug 40, including its holding strap 46 and its hold down annulus 48, are formed, the resulting plugs are liberally coated with talcum powder and placed in a suitable oven or the like and heated at 400 degrees F. for approximately one-half hour. Thereafter the plugs that have been so heated are cooled to ambient temperatures, with the result that the talcum powder particles involved have become entrapped in the surface pores of the silicon rubber material involved, and this is particularly advantageous when the plug 40 is serving its sealing function by being positioned as indicated in FIGS. 5 and 6 so that the housing aperture portion 74 has compressed the plug shank 60 to form the seal area 80. The result is that the metal of the housing 12 defining the portion 74 of the aperture 44 and the shank 60 of plug body 80 define a coefficient of friction that approximates 0.28 (plus or minus 0.02).

Further, the interference fit between the plug 40 and the housing aperture 44 in forming the seal area 80 of the plug 40 provides a force acting normally of the plug shank 60, with the resulting static friction involved holding the plug 40 in place so long as the gauge pressure of the gauge internal chamber protected by the plug 40 does not exceed the limits referred to hereinafter. The interference fit involved between the plug 40 and the receptacle hole 44, and specifically hole portion 74, is thus such that when the gauge internal pressure of, for instance, the high pressure chamber 18 which the aperture 44 is exposed to is high enough, the holding force involved that acts to hold the plug 40 in sealing relation with the housing 12 is exceeded (assuming that the instrument 10 is in air at ambient pressure), thereby causing the plug 40 to in effect "blow out" of the aperture 44. For this purpose the plug 40 includes the sealing strap 46 and its anchoring annulus 48 for fixing the plug to the exterior of the housing by way of suitable screw device 90 being turned in to suitable opening 52 drilled and tapped in housing 12 for this purpose (washer 92 may be provided if so desired, and, of course, aperture 52 may be formed at any convenient location about aperture 44 on the exterior of housing 12 within the reach of plug strap 46, and also suitably spaced from a housing reinforcement wall 94, as selected by the designer). This anchoring of the plug 40 prevents free flight of the plug after "pop off", with the plug 40 thus being retained adjacent the instrument housing 12, and being reuseable by simply pressing the plug back into the position shown in FIGS. 5 and 6.

Screw device 90 comprises any suitable type of screw 91, and, of course, it may be self tapping if so desired (in which case tapping of opening 52 is not necessary).

In the event that the housing internal chamber that is served by the arrangement 56 has internal pressures of on the order of 15 psig and below, the undersurface 86 of the stop cap 62 is proportioned to provide under the pressure limits indicated leak free sealing. This is particularly true where vacuum pressure is applied to the housing internal chamber that is serviced by a plug arrangement 56.

In addition, the silicon rubber material plug in making the plug 40 has been found to display minimum compression set insuring an adequate plug holding force even on reuse, while the silicon rubber surfacing of the plug shank 60 that has been infused with talcum power using the procedure indicated provides a combination that insures consistent frictional holding forces and coefficient of friction at the seal area 80.

As to the specific gauge 10 that is disclosed, and with reference to the housing back 15, as indicated in FIG. 5, the housing 12 defines upstanding reinforcing walls 96 and 98 and upstanding rounded side wall 100 so that the housing walls 96, 98, and 100 project outwardly of the housing back or rear wall 15, as indicated in FIGS. 2, 3 and 5. The apertures 44 and 52 are thus formed in the depressed housing rear wall 15, but it will be apparent that they could be formed at any location on the housing that would provide the same sort of overpressure protection to a housing internal chamber that is connected to the ambient atmosphere by the indicated aperture 44. Consequently, it is clear that the overpressure arrangement 56 may be apaplied to an instrument housing at any desired location on the housing where the aperture 44 will access a housing internal chamber to be provided with the overprotection and relief that is hereindisclosed.

As has been already indicated hereinbefore, the plug arrangement 56 is arranged to provide overpressure relief specifically for pressure gauges of the type offered by the said Dwyer Instruments, Inc., against overpressure damage, with the pressure relief to be activated when the housing internal chamber serviced by the overpressure arrangement 56 exceeds approximately 20 psig in pressure, and in any event below the maximum level of approximately 40 psig. Experience has shown that an overpressure plug arrangement 56 made in accordance with this invention and having the proportioning indicated for differential gauges of the type indicated effects "pop out" of the plug 40 from the housing aperture 44 when the plug 40 is subjected to a housing internal pressure of approximately 30 psig.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. For a pressure gauge that includes a housing and sensing means within the housing for measuring pressure of a source of pressure externally of the housing,
    an overpressure blow out plug for pressure relief of the gauge internally of the housing,
    said plug comprising:
    a body formed from 30 durometer Shore A hardness scale silicon elastomer,
    said body defining:
    a generally cylindrical shank having an annular seal portion thereabout,
    a stop cap at one end of said shank defining a spherically contoured plug head portion forming an annular planar undersurface centered on said shank and having a marginal circular rim of a radius of approximately twice that of said shank,
    with said shank annular seal portion including surface pore entrapped talcum powder.

2. The blow out plug set forth in claim 1 wherein said body includes:
    a grip stem at the other end of said shank of reduced diameter, and,
    a mounting strap integral with said cap end and terminating in an annular anchor ring.

3. The blow out plug set forth in claim 1 wherein:
    said shank seal portion has a uniform coefficient of friction about said shank.

4. The blow out plug set forth in claim 1, wherein:
    said cap and said seal portion are centered with respect to said shank.

5. An overpressure relief arrangement for a pressure gauge that includes a metallic housing having a pressure wall defining a pressure chamber within the housing and having a sensing measuring means within the housing for measuring the pressure of a source of gas under pressure located externally of the housing,
    said overpressure relief arrangement comprising:
    a rounded aperture defined by the metal of the housing pressure wall connecting the chamber through the housing wall to the ambient atmosphere, and,
    an overpressure blow out plug received in said aperture with an interference fit,
    said plug comprising a body formed from Shore A hardness scale silicon rubber and defining:
    a generally cylindrical shank including an annular seal area thereabout that is compressed by the metal of said housing forming said aperture, with the cross section of said aperture defined by said metal and said plug seal area being proportioned to effect the compression of said shank at said seal area that approximates eleven and one-half per cent of said shank diameter,
    said plug shank seal area including surfacing engaged by said metal forming said aperture having shank pore entrapped talcum powder.

6. The overpressure arrangement set forth in claim 5 wherein:
    the coefficient of friction between said seal area and the metal forming said bore is approximately 0.28.

7. The overpressure arrangement set forth in claim 5 wherein said plug includes:
    a stop cap at and centered on the outer end of said aperture defining a spherically contoured plug head portion having a planar undersurface centered on said shank and bearing against said housing about said aperture,
    said cap defining a marginal circular rim of a radius approximately twice that of said shank as uncompressed by said metal of said housing that defines said aperture.

8. The overpressure arrangement set forth in claim 7 wherein said plug further includes:
    a grip stem at the other end of said shank,
    and a mounting strap integral with said cap and terminating in an anchor ring.

9. The overpressure arrangement set forth in claim 7, wherein:
    said aperture has a diameter in the range of from approximately 0.225 inch to approximately 0.227 inch,
    said aperture portion that compresses said shank having a length longitudinally of said aperture that is approximately 0.05 inch, and said shank of said plug as uncompressed by said aperture has a diameter in the range of from approximately 0.253 inches to approximately 0.257 inches.

10. The overpressure arrangement set forth in claim 9 including:
means for anchoring said mounting strap anchor ring to the housing.

11. In an overpressure plug for pressure gauges including a shank, the method of processing the shank including the steps of:
forming the shank from Shore A hardenss scale silicon rubber,
coating the surfacing of the shank with talcum powder,
heating the thus coated shank for approximately one-half hour at 400 degrees F.,
and then cooling the coated shank to ambient temperature.

12. The method set forth in claim 11 wherein:
the entire plug is subjected to said coating, heating, and cooling steps.

* * * * *

UNITED STATES PATENT AND TRADEMARK OFFICE
CERTIFICATE OF CORRECTION

PATENT NO. : 5,012,678 Page 1 of 1
DATED : May 7, 1991
INVENTOR(S) : Buchanan, Steven O.

It is certified that error appears in the above-identified patent and that said Letters Patent is hereby corrected as shown below:

Title page,
Item [73], Assignee, should read as follows:
-- [73] Assignee: Dwyer Instruments, Inc. --.

Signed and Sealed this

Thirtieth Day of August, 2005

JON W. DUDAS
*Director of the United States Patent and Trademark Office*